Patented Dec. 30, 1930

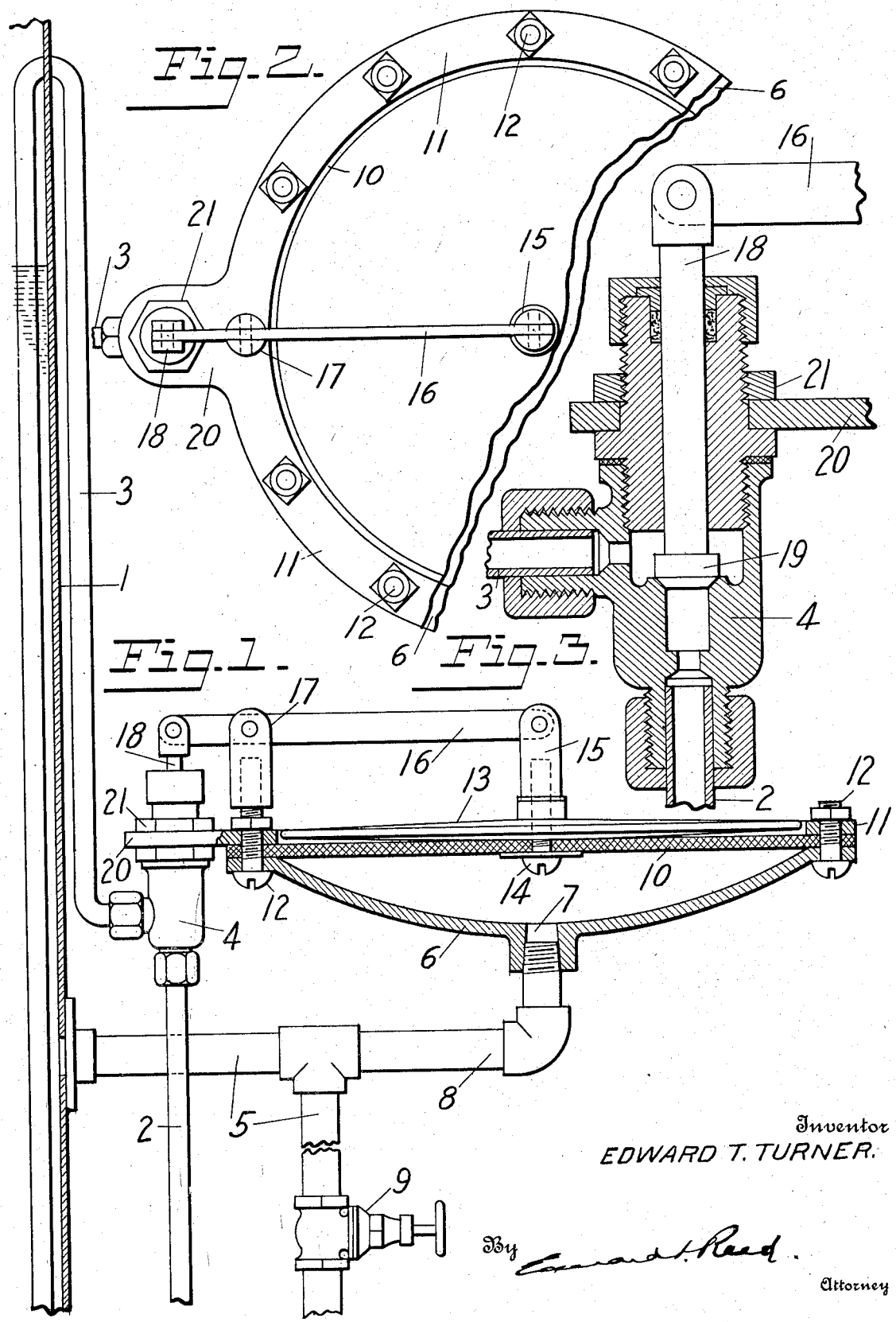

1,787,130

UNITED STATES PATENT OFFICE

EDWARD T. TURNER, OF DAYTON, OHIO

LEVEL-CONTROLLING DEVICE FOR LIQUID CONTAINERS

Application filed January 3, 1927. Serial No. 158,711.

This invention relates to a level controlling device for liquid containers and is designed more particularly for use in maintaining a constant level of liquid in the brine generating tank of a water softening apparatus. The means for controlling the level of liquid in the brine tanks of water softening apparatuses as ordinarily constructed comprises a float controlled valve, the float being arranged either within the brine generating tank or in an auxiliary tank connected with the generating tank. In either instance the brine will crystallize upon the float and the associated mechanism to such an extent as to interfere with the proper operation of the mechanism.

One object of the present invention is to provide a level controlling device which will be located entirely outside of the brine tank or other container.

A further object of the invention is to provide a level controlling device which will be so arranged and so connected with the liquid container that the valve operating mechanism will be controlled by the pressure of the liquid in the container.

A further object of the invention is to provide such a level controlling device which will be simple in its construction, inexpensive to manufacture, compact in arrangement and not liable to be rendered inoperative either by crystallization of the brine or otherwise.

Other objects of the invention will appear as the device is described in detail.

In the accompanying drawings Fig. 1 is a side elevation, partly in section, of a device embodying my invention, showing the same connected with a brine tank; Fig. 2 is a plan view of a portion of the pressure operated device and valve operating mechanism; and Fig. 3 is a sectional view of the valve.

In these drawings I have illustrated one embodiment of my invention and have shown the same as applied to the brine tank of a water softening apparatus but it will be understood that the device may take various forms and may be used for determining the level of the liquid of various kinds in containers of various shapes without departing from the spirit of the invention.

In the present illustration of the device I have shown a portion of a brine tank 1 which is adapted to contain a body of salt and to which water is admitted for the purpose of generating brine which is drawn out from the tank to the water softener as desired. The water is delivered to the tank by means of a supply pipe consisting of a section 2, which may be connected with any suitable source of supply for the water, and a section 3 which communicates with the container or tank. The two sections are connected by a valve 4 which serves to control the flow of water therethrough. In the present construction the water is delivered to the brine tank near the bottom thereof and the valve 4 is arranged a considerable distance below the top of the tank. I have therefore shown the section 3 of the supply pipe as bent upon itself so that it is of an elongated U-shape, the outer arm of the U extending upwardly along the outer side of the container and the inner arm thereof extending downwardly from a point near the top of the container to a point near the lower end of the container. The container is provided with a discharge pipe 5 connected therewith at a point some distance below the normal level of the liquid therein and, in the present instance, above the normal level of the body of salt contained within the container.

Suitable operating mechanism is provided for the valve 4 and is arranged exteriorly of the container and so connected therewith that the valve will be opened and closed as the liquid falls and rises in the container. Preferably, this valve operating device comprises a liquid receptacle 6 which is connected with the container at a point a considerable distance below the normal level of the liquid in the container and, as here shown, the receptacle 6 has an inlet opening 7 which is connected with a pipe 8 which in turn is connected with the discharge pipe 5 of the container, although it will be obvious that the pipe 8 may be connected with the container in any suitable manner. Associated with the receptacle 6 is a movable member the movement of which will control the operation of the valve 4. The movement or position of the movable member of the valve actuating device is controlled by the pressure of the liquid within the container. The receptacle being located below the normal level of the liquid in the container and being connected with the container below such normal level, it will be apparent that the pressure of the liquid in the container will be transmitted through the pipes 5 and 8 to the receptacle and will act upon the movable member of the valve actuating device. It will be understood, of course that the discharge pipe 5 is normally closed at a point beyond its connection with the pipe 8, as by means of a valve 9. The liquid receptacle 6 and the movable member which is associated therewith may take various forms but, as here shown, the receptacle is concave in form and its open upper side is closed by a diaphragm 10 of flexible material which constitutes the movable member of the valve controlling device. Preferably an annular member or ring 11 rests upon the diaphragm above the peripheral portion of the receptacle 6 and is rigidly secured to the receptacle by means of bolts 12, whereby the diaphragm is firmly secured to the receptacle at its edge and a tight joint is provided between the diaphragm and the receptacle. Resting upon the diaphragm 10 is a plate 13 which is rigidly secured to the diaphragm at the center thereof, as by means of a screw 14. This plate is of a diameter slightly less than the diameter of the diaphragm and its lower surface is inclined from the central portion thereof toward its edge, thus leaving the diaphragm free to flex. Mounted on the plate 6 is a bracket 15 which, in the present instance, is secured to the plate by the screw 14. Pivotally connected with the bracket 15 is a lever 16 which is pivotally mounted between its ends on a bracket 17 carried by the receptacle 6 and, in the present instance, secured thereto by means of one of the screws 12. The outer end of the lever 16 is pivotally connected with a stem 18 of the movable valve member 19 of the valve 4 so that the movement of the diaphragm will be transmitted through the lever 16 to the valve member 19. The arrangement of the parts is such that when the pressure on the underside of the diaphragm is relieved the latter will move downwardly under the weight of the plate 13, thereby moving the valve member to its open position and permitting the flow of water to the container. As the water in the container rises the pressure on the lower side of the diaphragm will increase until, when the water has reached its normal level in the container, this pressure will be sufficient to move the diaphragm to its uppermost position and close the valve 19, thus interrupting the flow of water to the container. When the valve 9 of the discharge pipe 5 is opened the flow of water through the discharge pipe will create a suction in the receptacle 6 which will tend to draw the diaphragm downwardly and to quickly open the valve in the supply line thereby immediately replenishing the supply of water in the tank. Preferably the valve 4 is rigidly connected with the receptacle 6 so as to maintain the same in a fixed position with relation to the valve operating devices and, in the present device, the clamping ring 11 is provided with a radial lug 20 through which the upper portion of the valve casing extends and in which it is secured by means of a nut 21.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. The combination with a container for a liquid, a supply pipe connected with said container, and a valve to control the flow of liquid through said supply pipe, of a concave receptacle having open communication with said container at a point below the normal level of the liquid in said container, a diaphragm extending across the concave side of said receptacle, a clamping ring resting upon said diaphragm, means for securing said ring to said receptacle to clamp the edge of said diaphragm between the ring and said receptacle, said ring having a part projecting therefrom and adapted to engage said valve and support the same in fixed relation to said receptacle, and an operative connection between said diaphragm and said valve.

2. In a liquid level controlling device for a tank having a supply pipe, a valve in said supply pipe, a discharge pipe connected therewith below the normal level of the liquid therein, and a valve in said discharge pipe, a pressure operated device mounted exteriorly of said tank and comprising a liquid level receptacle, and a flexible element closing the upper side of said receptacle, means for connecting said receptacle with said discharge pipe between the discharge valve and the tank, whereby when said discharge valve is closed the pressure of the liquid in said tank above said discharge pipe will be exerted on said flexible element and when said discharge valve is opened the flow of liquid through said discharge pipe will create a suction in said receptacle, an actuating device for the inlet valve, and means for operatively connecting said actuating device with said flexible element.

3. The combination with a container for liquid, a supply pipe connected with said container, and a valve to control the flow of liquid through said supply pipe, of a concave receptacle having open communication with said container at a point below the normal level of the liquid in said container, a diaphragm extending across the concave side of said receptacle and secured at its circumferential edge to said receptacle, a weighted disk of less diameter than said diaphragm supported on said diaphragm to yieldably resist the upward movement thereof, an actuating device for said valve, and means for operatively connecting said actuating device with said disk.

In testimony whereof, I affix my signature hereto.

EDWARD T. TURNER.